United States Patent
Kim et al.

(10) Patent No.: US 11,318,397 B2
(45) Date of Patent: May 3, 2022

(54) NIPA PALM EXTRACT PREPARATION METHOD AND NIPA PALM EXTRACT PREPARED BY MEANS OF SAME

(71) Applicant: CJ CHEILJEDANG CORPORATION, Seoul (KR)

(72) Inventors: Yeo Jin Kim, Seoul (KR); Hyung Cheol Kim, Yongin-si (KR); Su Jin Kim, Seoul (KR); Hee Jeung Kim, Suwon-si (KR); Byoung Seok Moon, Anyang-si (KR); Su Jin Bae, Suwon-si (KR); Hong Wook Park, Seoul (KR)

(73) Assignee: CJ Cheiljedang Corporation, Seoul (KR)

( * ) Notice: Subject to any disclaimer, the term of this patent is extended or adjusted under 35 U.S.C. 154(b) by 250 days.

(21) Appl. No.: 16/608,655

(22) PCT Filed: Apr. 9, 2018

(86) PCT No.: PCT/KR2018/004113
§ 371 (c)(1),
(2) Date: Oct. 25, 2019

(87) PCT Pub. No.: WO2018/199503
PCT Pub. Date: Nov. 1, 2018

(65) Prior Publication Data
US 2021/0113939 A1    Apr. 22, 2021

(30) Foreign Application Priority Data

Apr. 26, 2017  (KR) .................. 10-2017-0053329

(51) Int. Cl.
*B01D 11/00*  (2006.01)
*A23L 33/00*  (2016.01)
*B01D 11/02*  (2006.01)
*A23L 33/105*  (2016.01)

(52) U.S. Cl.
CPC ........ *B01D 11/0288* (2013.01); *A23L 33/105* (2016.08); *A23L 33/30* (2016.08)

(58) Field of Classification Search
CPC ..... B01D 11/0288; A23L 33/30; A23L 33/105
See application file for complete search history.

(56) References Cited

FOREIGN PATENT DOCUMENTS

| CN | 105941608 A | 9/2016 | |
|---|---|---|---|
| JP | H09-000220 A | 1/1997 | |
| KR | 10-1662779 B1 | 10/2016 | |
| KR | 10-2016-0149748 A | 12/2016 | |
| KR | 10-1710189 B1 | 2/2017 | |
| KR | 10-1710507 B1 | 2/2017 | |
| KR | 101710193 B1 | 2/2017 | |
| KR | 102257307 B1 * | 5/2021 | ............... A23F 3/00 |

OTHER PUBLICATIONS

International Search Report from International Application No. PCT/KR2018/004113, dated Jul. 12, 2018.
Written Opinion from International Application No. PCT/KR2018/004113, dated Jul. 12, 2018.
Chinese Office Action for CN Application No. 201880026534.8 dated Feb. 28, 2022 (15 pages, with translation).

* cited by examiner

*Primary Examiner* — Sikarl A Witherspoon
(74) *Attorney, Agent, or Firm* — Merchant & Gould P.C.

(57) ABSTRACT

The present application relates to a nipa palm extract preparation method and a nipa palm extract prepared by means of same.

9 Claims, 1 Drawing Sheet

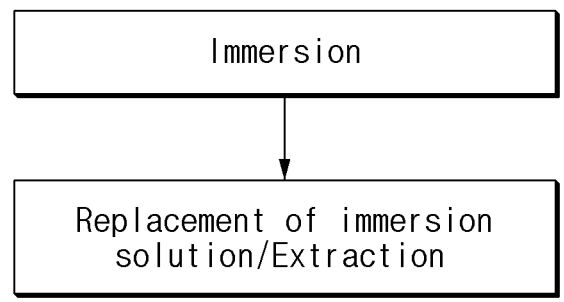

NIPA PALM EXTRACT PREPARATION METHOD AND NIPA PALM EXTRACT PREPARED BY MEANS OF SAME

This application is a National Stage Application of International Application No. PCT/KR2018/004113, filed Apr. 9, 2018, which claims benefit of Serial No. 10-2017-0053329, filed Apr. 26, 2017 in Korea and which applications are incorporated herein by reference. To the extent appropriate, a claim of priority is made to each of the above disclosed applications.

TECHNICAL FIELD

The present application relates to a nipa palm extract preparation method and a nipa palm extract prepared by means of the same.

BACKGROUND ART

As an interest in health promotion increases, demand for diverse functional health foods is increasing. In particular, there is a high interest in polyphenols having antioxidant and anti-inflammatory effects among raw ingredients of functional health food. Polyphenols have two or more hydroxyl groups and are known to have antioxidant properties in which reactive oxygen (harmful oxygen) present in the body is changed into a harmless substance. Therefore, they have been applied to various types of foods.

As a polyphenol-containing raw ingredient of functional food, a nipa palm has recently attracted attention. The nipa palm is native to Southeast Asia, including India and Malaysia, and Australia, and grows in wetlands such as a mangrove forest area and the like. Also, it contains various phytochemicals such as polyphenols, alkaloids, cardiac glycosides, saponins, and the like. The nipa palm in an extracted, concentrated, or powdered state is a raw ingredient that can be used in various ways as a polyphenol-containing food additive, and, therefore, there is a need for research on making nipa palm applicable to various types of foods.

Once harvested, the nipa palm is distributed in a salted state to increase the storage period, and therefore, it is necessary to lower salinity by immersing the nipa palm in water in order to use it as a food material in an extract or powder form. However, the method of lowering the sodium content through a desalination process has a problem in which the content of polyphenol in the final extract is also decreased.

PATENT DOCUMENTS (Patent Document 1) KR 10-1662779 B1 (Oct. 6, 2016)

DISCLOSURE

Technical Problem

The present application has been made to solve the above-described problems, and is directed to providing a method of preparing a nipa palm extract, particularly, to providing a method of preparing a nipa palm extract that includes a step of: immersing the nipa palm in cold water; and a step of recovering the nipa palm from an immersion solution in which the nipa palm is immersed and extracting the recovered nipa palm, and the nipa palm extract prepared by means of the same.

Technical Solution

One aspect of the present application provides a method of preparing a nipa palm extract that includes a step of: immersing a nipa palm in cold water; and a step of recovering the nipa palm from an immersion solution in which the nipa palm is immersed and extracting the recovered nipa palm (see FIG. 1).

Nipa palm (scientific name: *Nipa fruticans*) is a perennial plant belonging to the Arecaceae family. The nipa palm is native to Southeast Asia, including India and Malaysia, and Australia and grows in wetlands such as a mangrove forest area and the like. The nipa palm's rhizome is branched beneath the ground, and the leaves grow in a cluster above the ground and have a glossy green color. The flowers are monoecious, come out of the leaf axil above the ground, and bloom in all directions at a peduncle. The nipa palm contains a large amount of various antioxidants and phytochemicals, such as polyphenols, alkaloids, cardiac glycosides, saponins, selenium, and the like, and various types of nutrients.

The nipa palm according to the present application may be one or more selected from usable parts such as a peduncle, a root, a stem, an inflorescence, a leaf, and the like. Specifically, a nipa palm peduncle may be used.

The method according to the present application may further comprise a step of pulverizing a nipa palm before the step of immersing the nipa palm in cold water. Specifically, the nipa palm may be pulverized into a size of 0.1 mm×0.1 mm×0.1 mm to 20 mm×20 mm×200 mm, more specifically, 1 mm×1 mm×1 mm to 10 mm×10 mm×100 mm. When the nipa palm is pulverized into a size smaller than 0.1 mm×0.1 mm×0.1 mm, economic feasibility of the process is degraded, and when the nipa palm is pulverized into a size greater than 20 mm×20 mm×200 mm, yield is degraded.

In the step of immersing a nipa palm in cold water, the nipa palm is immersed in cold water to elute sodium from the nipa palm. Specifically, the step of immersing may be carried out in cold water in an amount of 15 to 100 times, specifically, 20 to 40 times the weight of nipa palm. When cold water is used in an amount smaller than the above-described range, a nipa palm cannot be sufficiently immersed, and when cold water is used in an amount larger than the above-described range, economic feasibility of the process can be degraded.

A temperature of the cold water may be 0 to 10° C., specifically, 4 to 10° C. When a temperature of cold water is lower than 0° C., a preparation process is not easily performed, and thus economic feasibility of the process is degraded. When a temperature of cold water is higher than 10° C., not only sodium but also polyphenols are eluted, and thus the total content of polyphenol in an extract is lowered. The step of immersing in cold water may be carried out for 1 to 72 hours, specifically, 3 to 24 hours. When the step of immersing is carried out for less than 1 hour, a nipa palm cannot be sufficiently immersed, and when the step of immersing is carried out for more than 72 hours, production efficiency can be degraded, and microorganisms can be proliferated.

In the step of recovering the nipa palm from an immersion solution in which the nipa palm is immersed and extracting the recovered nipa palm, an immersion solution is replaced by removing the immersion solution in which the nipa palm is immersed and re-immersing the nipa palm having been immersed by feeding water, and an effective ingredient is extracted from the immersed nipa palm.

The step of recovering the nipa palm from an immersion solution in which the nipa palm is immersed and extracting the recovered the nipa palm may comprise a step of dehydrating the immersed nipa palm after the removal of an immersion solution. The dehydration is a process of removing an immersion solution (sodium) remaining in the immersed nipa palm and may be carried out for 1 to 30 minutes, specifically, 3 to 10 minutes. When the dehydration is carried out for less than a minute, an immersion solution (sodium) remaining in the immersed nipa palm is insufficiently removed, and when the dehydration is carried out for more than 30 minutes, an effective ingredient contained in the immersed nipa palm is also removed.

In the step of recovering the nipa palm from an immersion solution, the immersion solution is replaced by removing the immersion solution in which the nipa palm is immersed and then feeding water, thereby re-immersing the nipa palm having been immersed. Specifically, the step of recovering the nipa palm from an immersion solution in which the nipa palm is immersed may be carried out by removing an immersion solution and then feeding water in an amount of 10 to 50 times, specifically, 15 to 30 times the weight of the nipa palm, thereby re-immersing the nipa palm having been immersed. When water is used in an amount smaller than the above-described range, an effective ingredient contained in the immersed nipa palm can be insufficiently extracted, and when water is used in an amount larger than the above-described range, a concentration or drying time is prolonged during the subsequent concentration or powdering process, and thus economic feasibility of the process can be degraded.

In the step of extracting the nipa palm, an effective ingredient in the nipa palm is dissolved in water by immersing the nipa palm in water. The step of extracting the nipa palm may be carried out at 90 to 250° C., specifically, 100 to 200° C. When the step of extracting the nipa palm is carried out at lower than 90° C., an effective ingredient cannot be smoothly extracted from the immersed nipa palm, and when the step of extracting the nipa palm is carried out at higher than 250° C., salts and other ingredients can be produced due to side reactions, and thus economic feasibility of the process can be degraded. In addition, the step of extracting the nipa palm may be carried out for longer than 0 hour and 5 hours or less, specifically, for 30 minutes to 3 hours. When the step of extracting the nipa palm is not carried out, an effective ingredient cannot be extracted from the immersed nipa palm, and when the step of extracting the nipa palm is carried out for longer than 5 hours, the sodium content in an extract can increase, and salts and other ingredients can be produced, and thus economic feasibility of the process can be degraded.

The method according to the present application may further comprise a step of sterilizing an extract after the extraction. The step of sterilizing may allow the extract obtained in the step of extracting the nipa palm to be stored for a long period of time. The step of sterilizing may be carried out at 60 to 110° C. for 10 to 50 minutes, specifically, at 70 to 100° C. for 20 to 40 minutes. When the step of sterilizing is carried out at lower than 60° C. or for shorter than 10 minutes, it is difficult to obtain a sufficient effect of sterilizing the extract, and when the step of sterilizing is carried out at higher than 110° C. or for longer than 50 minutes, salts and other ingredients can be produced due to side reactions, and thus economic feasibility of the process can be degraded.

The method according to the present application may further comprise a step of cooling the sterilized extract after the step of sterilizing the extract. The step of cooling may allow the extract to be kept under refrigeration for a long period of time. The step of cooling may be carried out at 1 to 7° C. for 30 minutes to 2 hours, specifically, at 2 to 6° C. for 45 minutes to 1.5 hours. When the step of cooling is carried out at lower than 1° C. or for longer than 2 hours, economic feasibility of the process can be degraded, and when the step of cooling is carried out at higher than 7° C. or for shorter than 30 minutes, the extract cannot be sufficiently cooled.

The method according to the present application may further comprise a step of filtering the extract after the step of extracting the nipa palm. In the step of filtering the extract, a foreign substance and a sediment are removed from the extract obtained in the step of extracting the nipa palm. The step of filtering may be carried out using a filter with a pore size of 0.1 m to 3 m, specifically, 0.5 m to 2 m. When the extract is filtered through a filter with a pore size of less than 0.1 m, the filtration rate is low, and thus economic feasibility of the process can be degraded. When the extract is filtered with a filter with a pore size of greater than 3 m, a foreign substance and a sediment are not sufficiently filtered, and thus can become problematic.

The method according to the present application may further comprise a step of concentrating the extract after the step of extracting the nipa palm. The step of concentrating the extract is a process for conveniently using the extract as a food material through concentration. Specifically, the step of concentrating may be carried out using a known concentration meter under conditions of 40 to 60° C., 30 to 50 rpm, and 20 to 40 mbar. The step of concentrating may be carried out such that the concentration of the extract is 5 to 30 Brix, specifically, 10 to 25 Brix. When the step of concentrating is carried out such that the concentration of the extract is outside the above-described range, a powdering process to be described below cannot be easily performed, economic feasibility of the process can be degraded, and the use of the extract as a food material may be difficult.

The method according to the present application may further comprise a step of sterilizing the concentrated extract after the step of concentrating the extract. The step of sterilizing may allow the concentrated extract to be stored for a long period of time. The step of sterilizing may be carried out at 60 to 110° C. for 10 to 50 minutes, specifically, at 70 to 100° C. for 20 to 40 minutes. When the step of sterilizing is carried out at lower than 60° C. for shorter than 10 minutes, it is difficult to obtain a sufficient sterilization effect, and when the step of sterilizing is carried out at higher than 110° C. for longer than 50 minutes, salts and other ingredients can be produced due to side reactions, and thus economic feasibility of the process can be degraded.

The method according to the present application may further comprise a step of cooling the extract after the step of sterilizing the concentrated extract. The step of cooling may allow the concentrated extract to be kept under refrigeration for a long period of time. The step of cooling may be carried out at 1 to 7° C. for 30 minutes to 2 hours, specifically, at 2 to 6° C. for 45 minutes to 1.5 hours. When the step of cooling is carried out at lower than 1° C. for longer than 2 hours, economic feasibility of the process can be degraded, and when the step of cooling is carried out at higher than 7° C. for shorter than 30 minutes, the extract cannot be sufficiently cooled.

The method according to the present application may further comprise a step of powdering the extract after the step of extracting the nipa palm. When the extract is powdered, it is easily stored as a food material and can be applied to various products. Specifically, the extract may be freeze-dried and then powdered.

Another aspect of the present application provides a nipa palm extract prepared by means of the above-described method. The extract may be in a liquid or powder form. The extract is prepared by the above-described method, so that 2 to 4 g of sodium chloride, as measured with a salimeter, and 0.40 to 0.50 g of polyphenol per 1 kg of the extract are maintained, and therefore, it may be used as various food raw ingredients.

Advantageous Effects

A preparation method according to the present application can allow the total content of polyphenol to be maintained at a high level while lowering the sodium content and the storage period to be enhanced by extracting a nipa palm after immersion in cold water.

In addition, a nipa palm extract according to the present application can be used as various food raw ingredients and can exhibit higher antioxidant and anti-inflammatory effects compared to a conventional nipa palm extract because the total content of polyphenol is maintained at a high level while lowering the sodium content by means of the preparation method.

DESCRIPTION OF DRAWINGS

FIG. 1 is a flowchart of a method of preparing a nipa palm extract according to the present application.

MODES OF THE INVENTION

Hereinafter, the present application will be described in more detail with reference to specific examples. However, the following examples are only exemplary and the scope of the present application is not limited to the following examples.

EXAMPLES

Preparation Example 1: Preparation of Nipa Palm Extract (1) Immersion of Nipa Palm in Cold Water A nipa palm peduncle was pulverized into a size of 10 mm×10 mm×100 mm, and the pulverized nipa palm peduncle was immersed in water at 4° C. for 24 hours by adding water in an amount of 30 times the weight of the original nipa palm.

(2) Recovering the Nipa Palm from the Immersion Solution and Extraction the Recovered Nipa Palm An immersion solution in which the nipa palm was immersed was drained such that it was removed also from the immersed nipa palm peduncle, and the nipa palm peduncle was then dehydrated for 5 minutes to remove the immersion solution remaining in the nipa palm peduncle. Afterward, extraction was performed at 121° C. for 1 hour after adding water in an amount of 20 times the weight of the original nipa palm to the dehydrated nipa palm peduncle.

(3) Filtration and Concentration of Nipa Palm Extract

The resultant nipa palm extract was filtrated through a filter with a pore size of 1 m or less and then concentrated using a concentration meter (EYELA N-3000 rotary vacuum evaporator) under conditions of 50° C., 40 rpm, and 30 mbar until 20 Brix was reached. After the concentration was completed, the resultant extract was sterilized at 85° C. for 30 minutes, cooled at 4° C. for 1 hour, and then kept under refrigeration to prepare a final nipa palm extract.

Experimental Example 1: Measurement of Total Polyphenol Content, Solution Concentration, and Sodium Content According to Immersion Conditions (1) Preparation of Nipa Palm Extract Under Varying Immersion Conditions A nipa palm extract was prepared in the same manner as Preparation Example 1, except that a temperature or duration of immersion was varied and filtration and concentration processes were omitted. The detailed conditions for immersion and extraction of a control group and experimental groups 1 to 9 are shown in Tables 1 and 2.

(2) Measurement of Total Polyphenol Content, Solution Concentration, and Sodium Content According to Immersion Conditions To measure the total content of polyphenol, the concentration of a solution, and the sodium content according to a temperature and duration of immersion, the total polyphenol content, concentration, and sodium content of extracts according to a control group and experimental groups 1 to 9 were measured, and results thereof are shown in Tables 1 and 2.

Measurement methods of the total polyphenol content, the concentration of a solution, and the sodium content are as follows.

<Measurement of Total Polyphenol Content>

The total polyphenol content of an extract was measured by the Folin-Ciocalteu method. 80 μL of distilled water, 10 μL of a standard or an extract, and 10 μL of a Folin-Ciocalteu reagent were mixed and then allowed to stand at room temperature for 6 minutes. 100 μL of a 7% $Na_2CO_3$ solution was added and then allowed to stand at room temperature for 90 minutes, and absorbance was measured at 750 nm. In this case, the total polyphenol content in a sample was determined from a calibration curve obtained by using tannic acid as a standard substance.

<Measurement of Concentration (BRix)>

Concentration was measured using an Atago PAL-1 concentration meter (refractometer).

<Measurement of Sodium Content>

A sodium content was measured using an Atago PAL-03 S salimeter (refractometer).

TABLE 1

Comparison of total polyphenol content, solution concentration, and sodium content according to temperature of immersion

| Classification | Immersion temperature (° C.) | Immersion duration (hr) | Extraction temperature (° C.) | Extraction duration (hr) | Total polyphenol content (mg/ml) | Concentration (Brix %) | Sodium content (NaCl(g/100 g)%) |
|---|---|---|---|---|---|---|---|
| Control group | — | — | 121 | 1 | 0.47 | 0.3 | 0.6 |
| Experimental group 1 | 4 | 24 | 121 | 1 | 0.46 | 0.1 | 0.3 |
| Experimental group 2 | 10 | 24 | 121 | 1 | 0.45 | 0.1 | 0.3 |
| Experimental group 3 | 15 | 24 | 121 | 1 | 0.39 | 0.1 | 0.3 |
| Experimental group 4 | 25 | 24 | 121 | 1 | 0.36 | 0.1 | 0.3 |
| Experimental group 5 | 35 | 24 | 121 | 1 | 0.28 | 0.1 | 0.3 |

TABLE 2

Comparison of total polyphenol content, solution concentration, and sodium content according to duration of immersion

| Classification | Immersion temperature (° C.) | Immersion duration (hr) | Extraction temperature (° C.) | Extraction duration (hr) | Total polyphenol content (mg/ml) | Concentration (Brix) | Sodium content (%) |
|---|---|---|---|---|---|---|---|
| Control group | — | — | 121 | 1 | 0.47 | 0.3 | 0.6 |
| Experimental group 6 | 4 | 1 | 121 | 1 | 0.47 | 0.2 | 0.4 |
| Experimental group 7 | 4 | 3 | 121 | 1 | 0.44 | 0.2 | 0.3 |
| Experimental group 8 | 4 | 6 | 121 | 1 | 0.45 | 0.1 | 0.3 |
| Experimental group 1 | 4 | 24 | 121 | 1 | 0.46 | 0.1 | 0.3 |
| Experimental group 9 | 4 | 72 | 121 | 1 | 0.46 | 0.1 | 0.3 |

As shown in Table 1 regarding the temperature of immersion, a control group in which extraction was not preceded by an immersion process exhibited a high sodium content of 0.6%, whereas a case in which extraction was performed after 24-hour immersion exhibited a lower sodium content of 0.3% regardless of the immersion temperature. However, it can be seen that the total polyphenol content tended to decrease as the immersion temperature increased, and when extraction was performed after immersion at a low temperature of 10° C. or less, a sodium content was lowered but the total polyphenol content was not decreased, indicating that the total polyphenol content is highly affected by the temperature of immersion.

As shown in Table 2 regarding the duration of immersion, an experimental group 6 in which extraction was performed after 1 hour immersion exhibited a low salinity compared to a control group in which extraction was performed without an immersion process, and as a result of increasing the duration of immersion to 3 to 72 hours, the sodium content was maintained at 0.3%. Thus, it can be seen that, in consideration of production efficiency, proliferation of microorganisms, and the like, it is effective to perform the immersion for 3 to 24 hours.

Experimental Example 2: Measurement of Total Polyphenol Content, Solution Concentration, and Sodium Content According to Extraction Conditions (1) Preparation of Nipa Palm Extract Under Varying Extraction Conditions A nipa palm extract was prepared in the same manner as Preparation Example 1, except that a temperature or duration of extraction was varied and filtration and concentration processes were omitted. The detailed conditions for immersion and extraction of a control group and experimental groups 1 and 10 to 16 are shown in Tables 3 and 4.

(2) Measurement of Total Polyphenol Content, Solution Concentration, and Sodium Content According to Extraction Condition To measure the total polyphenol content, the concentration of a solution, and the sodium content according to a temperature and duration of extraction, the total polyphenol content, concentration, and sodium content of extracts according to a control group and experimental groups 1 and 10 to 16 were measured, and results thereof are shown in Tables 3 and 4.

TABLE 3

Comparison of total polyphenol content, solution concentration, and sodium content according to duration of extraction

| Classification | Immersion temperature (° C.) | Immersion duration (hr) | Extraction temperature (° C.) | Extraction duration (hr) | Total polyphenol content (mg/ml) | Concentration (Brix) | Sodium content (%) |
|---|---|---|---|---|---|---|---|
| Control group | — | — | 121 | 1 | 0.47 | 0.3 | 0.6 |
| Experimental group 1 | 4 | 24 | 121 | 1 | 0.46 | 0.1 | 0.3 |
| Experimental group 10 | 4 | 24 | 121 | 2 | 0.44 | 0.2 | 0.3 |
| Experimental group 11 | 4 | 24 | 121 | 3 | 0.44 | 0.3 | 0.4 |
| Experimental group 12 | 4 | 24 | 121 | 4 | 0.46 | 0.3 | 0.4 |
| Experimental group 13 | 4 | 24 | 121 | 5 | 0.57 | 0.4 | 0.5 |

TABLE 4

Comparison of total polyphenol content, solution concentration, and sodium content according to temperature of extraction

| Classification | Immersion temperature (° C.) | Immersion duration (hr) | Extraction temperature (° C.) | Extraction duration (hr) | Total polyphenol content (mg/ml) | Concentration (Brix) | Sodium content (%) |
|---|---|---|---|---|---|---|---|
| Control group | — | — | 121 | 1 | 0.47 | 0.3 | 0.6 |
| Experimental group 1 | 4 | 24 | 121 | 1 | 0.46 | 0.1 | 0.3 |
| Experimental group 14 | 4 | 24 | 90 | 1 | 0.2 | 0.1 | 0.3 |
| Experimental group 15 | 4 | 24 | 60 | 1 | 0.09 | 0.1 | 0.3 |
| Experimental group 16 | 4 | 24 | 30 | 1 | 0.07 | 0.1 | 0.3 |

As shown in Table 3 regarding the duration of extraction, it can be seen that an experimental group 13 in which the duration of extraction was increased up to 5 hours exhibited an increase in the total polyphenol content, but the content of other ingredients, including salts, was also increased, and the tissue of nipa palm was destroyed to form nipa palm debris. Also, it can be seen that when extraction was performed for 1 to 2 hours, the sodium content was maintained at 0.3%.

As shown in Table 4 regarding the temperature of extraction, it can be seen that the total polyphenol content tended to increase as the extraction temperature increased.

The invention claimed is:

1. A method of preparing a nipa palm extract, comprising:
a step of immersing the nipa palm in cold water; and
a step of recovering the nipa palm from an immersion solution in which the nipa palm is immersed and extracting the recovered nipa palm,
wherein the step of immersing is carried out in 0 to 10° C. cold water,
wherein the step of extracting is carried out at 90 to 250° C.

2. The method of claim 1, further comprising, before the step of immersing the nipa palm in cold water, a step of pulverizing the nipa palm.

3. The method of claim 1, wherein the step of immersing is carried out for 1 to 72 hours.

4. The method of claim 1, wherein the step of recovering the nipa palm from the immersion solution in which the nipa palm is immersed and extracting the recovered nipa palm comprises a step of dehydrating the immersed nipa palm for 1 to 30 minutes.

5. The method of claim 1, wherein the step of extracting is carried out for more than 0 hour and 5 hours or less.

6. The method of claim 1, further comprising, after the step of extracting, a step of sterilizing the extract at 60 to 110° C. for 10 to 50 minutes and cooling at 1 to 7° C. for 30 minutes to 2 hours after the step of extracting.

7. The method of claim 1, further comprising, after the step of extracting, a step of concentrating the extract.

8. The method of claim 7, further comprising, after the step of concentrating, a step of sterilizing the concentrated extract at 60 to 110° C. for 10 to 50 minutes and cooling at 1 to 7° C. for 30 minutes to 2 hours.

9. The method of claim 1, further comprising, after the step of extracting, a step of powdering the extract.

* * * * *